F. Monroe.

Earth Scraper.

№ 54,003. Patented Apr. 17, 1866.

Witnesses:

Inventor:

UNITED STATES PATENT OFFICE.

FREEDOM MONROE, OF BRUCE, MICHIGAN.

IMPROVEMENT IN LAND-LEVELERS.

Specification forming part of Letters Patent No. 54,003, dated April 17, 1866.

*To all whom it may concern:*

Be it known that I, FREEDOM MONROE, of the town of Bruce, in the county of Macomb, in the State of Michigan, have invented a certain new and useful Machine for Leveling the Surface of Meadow and other Lands, and which I denominate a "Land-Leveler;" and I do hereby declare the following to be a full, clear, and exact description of the same, reference being had to the annexed drawings, making part of this specification, in which—

Figure 1:
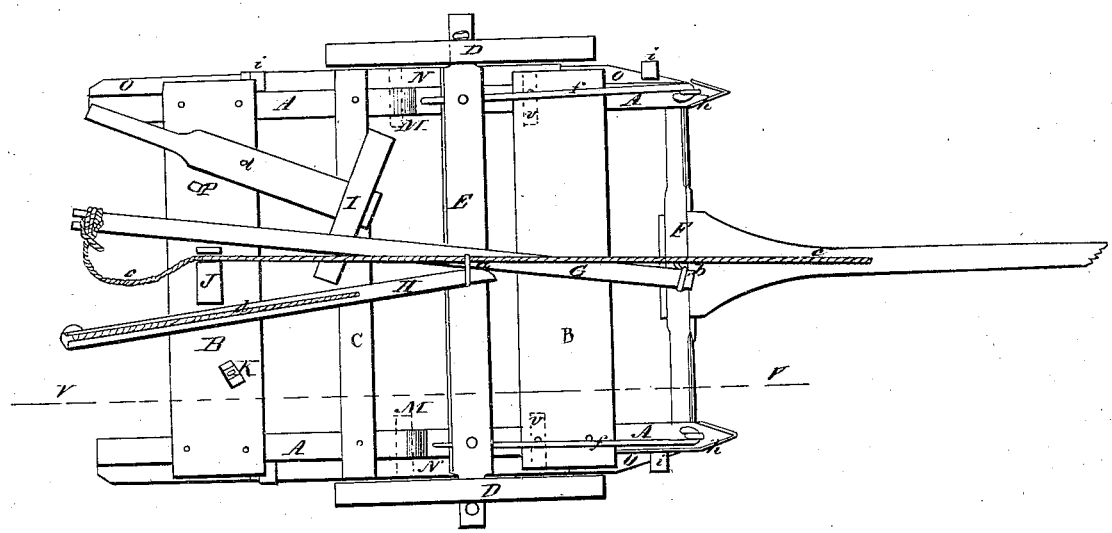
Figure 2:
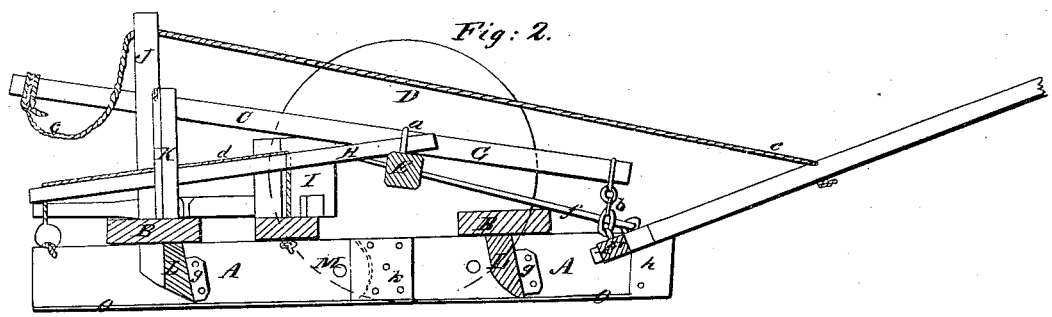

Figure 1 is a top view of said machine, and Fig. 2 is a longitudinal section taken on the line V V.

My invention consists of a machine so constructed as to take down the hills and ridges and fill up the holes and hollows in the surface of meadow or other lands, by which the passage of harvesting and other machines over the ground will be greatly facilitated, and the surface of the land beautified.

The following description of my machine will enable any one skilled in the arts to which my invention appertains to make and use the same.

My machine consists, first, of two runners or side pieces, (shown in the drawings by A A.) These side pieces are made of inch-and-a-half plank, one foot wide by eight feet long. These planks are cut through the center transversely, and are then joined together after the style of a socket-joint, the two parts being held together by means of a bar, N, which slides through staples $i$ on the side of the runners, and by pins M V, which pass through said bars into the runners, the pin M forming the center of the joint about which the two ends or parts of the runners vibrate. These joints are not intended to be used, however, except in case when the surface of the ground is marked by short undulations. At other times the runners are held straight and rigid by the bars N, which are then slipped back into the back staples, $i$, and the pin M is placed in the center of the joint, which brings the two parts of the runners upon an even plane and holds them there while the machine does its work. The runners aforesaid are made with a sharp front end to enable them to pass readily through the ground, and their bottoms are shod with suitable material, so as to preserve them from undue wear, and with a wide or narrow shoe, so as to permit them to sink into the ground to such depth as experience may show to be necessary; and the joint in said runners is protected by a metal plate in the inside of the runner, as shown by K. The shoe of the runners is shown by O O in blue. The runners being now constructed as aforesaid, they are united transversely by means of cross-planks B B, &c., so as to set upon parallel planes after the manner of an ordinary wood sled. Under each of these cross-planks there is a scraper, L, arranged, reaching from one runner to the other, and faced with a metal facing, the ends whereof form a flange, which are secured to the insides of the runners, as shown by $g$. These scrapers, as the machine moves over the ground, cut down the high places and fill up the low ones, leaving the surface of the ground as near level as the nature of the country will admit of.

Figure 3:
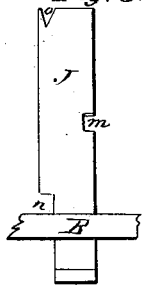

To facilitate the turning of this machine and the transportation thereof from one place or farm to another, I arrange across its top, about one-third the way back from the front end, an axle-tree, E, upon which two wheels, D D, are placed, in the manner shown in the drawings. This axle-tree I secure upon two iron rods, $f f$, the front ends whereof are hooked to staples to be driven in the front ends of the runners. These staples act as centers about which the said bars and the said axle-tree can rise and fall in obedience to the will of the attendant, who, when he wishes to raise the scrapers out of the ground, presses down on the rear end of the lever C and hooks it into a notch, $n$, Fig. 3, cut in the left-hand side of the post J, close to the rear plank, B, the front end of the lever being chained to the tongue-roller F, and the axle-tree acting as a fulcrum for the lever, to which it is attached at $a$ by means of a staple, as shown in the drawings.

To aid in raising the machine on the wheels there is a cord, $c$, stretched from the back part or end of the tongue, to which it is secured, as shown, over the top of the post J to the rear end of the lever, where it is secured, as shown.

Now, to raise the rear scraper when the joints in the runners are used, I fix the front end of a lever, H, to the axle-tree beside the other lever, as shown, and through it I lace a cord, $d$, and carry it down through the cross-piece C, where I secure one end. To the other end I fix a stopper and carry it back over the end of the lever in a notch made to receive it. Having thus arranged the lever and cord, I have only to raise the rear end of the lever and hook it into a notch, m, Fig. 3, cut in the right-hand side of the post J, to raise the back scraper off the ground. When this lever is not in use the cord d hangs in a notch cut in the top of a post, K, erected on the back cross-plank, B. When I desire to press the scrapers deeper into the ground I unhook the lever C and shove the fulcrum I under it and press down on the rear end of the lever. This fulcrum I is mortised on the end of a bar, P, which is riveted to the rear cross-plank, B, in the manner shown in the drawings.

Having now described the object and construction of my invention, what I claim, and desire to secure by Letters Patent, is—

1. In combination with runners A A, the scrapers L L, when said runners are made with the joint thereon, as described.

2. In combination with said runners and scrapers, the axle-tree E and its wheels D, for the purpose of raising and lowering the scrapers and for the purpose of turning and transporting the machine, as described.

3. The lever H and the cord d, in combination with the rear part of the machine, for the purpose of raising the rear scraper, in the manner described.

4. The lever C, arranged across the top of the machine, for the purpose of raising it against the axle-tree, substantially as described.

FREEDOM MONROE.

Witnesses:
I. D. HANSCOM,
E. F. MEAD.